US005362543A

United States Patent [19]

Nickerson

[11] Patent Number: 5,362,543
[45] Date of Patent: Nov. 8, 1994

[54] PRESSURE-COMPENSATING COMPOSITIONS AND PADS MADE THEREFROM

[75] Inventor: Lincoln P. Nickerson, Boulder, Colo.
[73] Assignee: Jay Medical, Ltd., Boulder, Colo.

[21] Appl. No.: 21,336
[22] Filed: Feb. 23, 1993
[51] Int. Cl.5 .................... B32B 1/06
[52] U.S. Cl. .................... 428/76; 428/68; 428/921; 524/860
[58] Field of Search .................... 428/76, 921; 524/860; 297/459

[56] References Cited

U.S. PATENT DOCUMENTS

| | | | |
|---|---|---|---|
| 3,237,319 | 3/1966 | Hanson | 36/2.5 |
| 3,325,920 | 6/1967 | Werner | 36/2.5 |
| 3,365,315 | 1/1968 | Beck | 106/40 |
| 3,402,411 | 9/1968 | Hanson | 12/142 |
| 3,407,406 | 10/1968 | Werner | 2/3 |
| 3,524,794 | 8/1970 | Jonnes | 277/228 |
| 3,635,849 | 1/1972 | Hanson | 128/595 |
| 3,736,612 | 6/1973 | Check et al. | 12/142 P |
| 3,798,799 | 3/1974 | Hanson et al. | 36/2.5 AL |
| 3,937,678 | 2/1976 | Yasuda | 260/28.5 R |
| 3,986,213 | 10/1976 | Lynch | 3/36 |
| 4,038,762 | 8/1977 | Swan | 36/89 |
| 4,064,565 | 12/1977 | Griffiths | 2/412 |
| 4,083,127 | 4/1978 | Hanson | 36/93 |
| 4,108,928 | 8/1978 | Swan | 264/26 |
| 4,144,658 | 3/1979 | Swan | 36/117 |
| 4,229,546 | 10/1980 | Swan | 521/55 |
| 4,243,754 | 1/1981 | Swan | 521/55 |
| 4,252,910 | 2/1981 | Schaefer | 521/145 |
| 4,255,202 | 3/1981 | Swan | 106/122 |
| 4,386,003 | 5/1983 | Fiehler | 252/60 |
| 4,588,229 | 5/1986 | Jay | 297/459 |
| 4,726,624 | 2/1988 | Jay | 297/459 |
| 4,728,551 | 3/1988 | Jay | 428/76 |
| 4,856,626 | 8/1989 | Nakanishi | 188/371 |
| 4,861,804 | 8/1989 | Nakanishi | 521/54 |
| 4,961,891 | 10/1990 | Pitolaj | 264/113 |
| 4,966,929 | 10/1990 | Tomoshige et al. | 524/71 |
| 5,005,575 | 4/1991 | Geri | 128/581 |
| 5,093,138 | 3/1992 | Drew et al. | 428/68 |
| 5,100,712 | 3/1992 | Drew et al. | 428/68 |
| 5,204,154 | 4/1993 | Drew et al. | 428/68 |

*Primary Examiner*—Alexander S. Thomas
*Attorney, Agent, or Firm*—Cook, Egan, McFarron & Manzo, Ltd.

[57] ABSTRACT

Pressure-compensating pads such as seats or cushions used in wheelchairs, can be filled with a flowable, pressure-compensating composition comprising a major portion of silicone fluid, a minor portion of amide thickener which is essentially insoluble in said silicone fluid and microballoons. The resulting compositions are particularly characterized by their ability to flow in response to a continuously applied pressure, yet to maintain their shape and position in the absence of applied pressure, and are further characterized by stable viscosity at temperatures generally associated with the presence of the human body and excellent fire retardant properties. The composition may also contain flame-retardant.

53 Claims, No Drawings

PRESSURE-COMPENSATING COMPOSITIONS AND PADS MADE THEREFROM

BACKGROUND OF THE INVENTION

The present invention generally relates to deformable, pressure-compensating padding devices such as seats, cushions, boot liners, mattresses etc., which are used in situations where the human body is in prolonged, abutting contact with a mechanical device. More specifically this invention relates to flowable, pressure-compensating compositions contained in such padding devices.

A wide variety of viscous, flowable, pressure-compensating compositions (often referred to as "thixotropic compositions") have been developed for use in seats, cushions, mattresses, fitting pads, athletic equipment (e.g., ski boot liners), prosthetic devices and similar mechanical apparatus which are placed in prolonged contact with the human body. Such compositions provide both firm support and comfort because they have the capacity to flow in response to continuously applied pressure, but they also have the ability to maintain their shape and position in the absence of continuously applied pressure. Pads designed for use with such compositions allow the pressure-compensating compositions contained in them to flow in response to continuously applied pressure and thereby adapt to the contour of a particular part of the human body. Representative pressure-compensating compositions and/or padding devices are described in several patent references.

THE PRIOR ART

U.S. Pat. No. 4,588,229 to Jay teaches a seat cushion which comprises a flexible envelope filled with a pressure-compensating, fluid material.

The Jay patent refers, inter alia, to U.S. Pat. No. 4,038,762; 4,144,658; 4,229,546; 4,243,754; and 4,255,202 to Swan which disclose a variety of viscous, flowable, pressure-compensating compositions which consist essentially of a major portion of petroleum-based oil (such as "Carnea" 21 or "Tufflo" 6204) and a minor amount of a petroleum-based wax (such as HM-1319) and a minor amount (by weight) of glass microbeads or lightweight, resinous microbeads or mixtures thereof.

U.S. Pat. No. 4,728,551 to Jay teaches a flowable pressure-compensating material, confined in a pad or envelope, which contains a flowable, continuous phase of oil which in turn contains a discontinuous phase comprised of discrete hollow microbeads and colloidal silica particles. The resulting pressure-compensating material flows in response to continuously applied pressure, but is essentially non-flowable in the absence of such pressure. The overall composition is relatively insensitive to temperature variations at those temperatures where these devices are normally employed (e.g., ambient and/or body temperature conditions).

It is of paramount importance that the flowable pressure-compensating compositions maintain their ability to flow in response to continuously applied pressure under all conditions of use. The prior art oil/wax compositions noted above perform reasonably well in many room and/or body temperature-defined situations. However, when these prior art compositions are subjected to temperatures higher than body temperatures or when subjected to body temperatures for long periods of time (i.e. six months or longer), the microbeads sometimes separate from the continuous phase materials or some of the fluid from the continuous phase separates from the continuous phase which results in the formation of non-flowable lumps in the composition. Separation is common in some prior art compositions after 6 months use, even without being subjected to temperature extremes. When such separation occurs, irrespective of the cause, the composition looses its ability to flow in response to continuously applied pressure and the non-flowable lumps which are formed by the separation can cause pressure build-up on the skin in the area of the lump and consequent skin damage. The separation may take place quickly particularly when the composition is exposed to elevated temperatures and, in many instances, the separation is irreversible. For example, unacceptable instances of phase separation of various oil/wax/microballoon compositions has been observed in cushions left in closed automobiles in strong sunlight. Under such conditions, temperatures above 120° F. and even temperatures of 170° F. are not uncommon and under such conditions serious, and often permanent, phase separation problems have taken place.

It is highly desirable that the flowable, pressure-compensating compositions maintain a stable, unchanging viscosity throughout the temperature range in which such compositions are used. Those skilled in the art also will appreciate that the viscosity of many oil/wax formulations can change drastically in those temperature ranges encountered during normal use. For example, in moving from about room temperatures (e.g., 75° F.) to body temperature (98.6° F.), the apparent viscosity of some oil/wax systems may drop by as much as 50%. Consequently, as compositions of this type are warmed to near skin temperature conditions (e.g., this occurs after about two hours of constant sitting upon a wheelchair cushion), such compositions often develop a "watery" texture, i.e. the composition looses its ability to maintain its shape and position in the absence of continuously applied pressure. This is undesirable because a watery or readily flowable composition will no longer afford the same physical stability and support for the user of the pad. Stability and support are prime requirements in the wheelchair seating of disabled persons since such persons tend to easily lose their vertical stability when sitting on unstable seating surfaces.

The hydrocarbon oil/wax compositions of the prior art, largely owing to the presence of their hydrocarbon type oil component-possess poor flame retardancy qualities. Obviously, pressure-compensating compositions having better fire retardant qualities are to be preferred.

The design of such flowable, pressure-compensating compositions must take several - often competing - factors into simultaneous consideration. These factors include: (1) weight: the composition should be light in weight because the less a product weighs, the easier it will be to handle and move, (2) viscosity stability with respect to temperature change: the flow and feel characteristics and position holding capabilities of such compositions should be temperature invariant as much as possible at those temperatures at which these devices are commonly used e.g., such compositions should not become "runny" at elevated ambient temperatures or "stiffen up" at relatively cold ambient temperatures (3) viscosity stability with respect to extended use: the viscosity of the composition should not change over time as the composition is used, (4) phase separation resistance: compositions having multiple components should not separate into two or more phases with the passage of time, (5) low cost: lower costs are always of concern to both the manufacturer and the consumer (6) skin irritation: The composition should not pose a significant skin sensitization or irritation potential, (7) micro-organism growth: The composition should have a low micro-organism food value potential in order to inhibit the growth of micro-organism (8) non-poisonous: The composition should have a high LD50 threshold (low risk of poisoning upon ingestion), (9) chemical compatibility with the envelope: The composition must not react with or permeate through the envelope in a manner which will result in leakage of the composition from the envelope, or cause a change in the physical properties of the envelope material or instability or phase separation of the composition and (10) fire resistance: such compositions are preferably non-flammable; for example, they should be able to pass a recognized fire retardancy test e.g., tests such as those like, or substantially similar to, the so-called "Cal 133 test" (California Technical Bulletin 133 Fire Resistance Test) which is used to test the fire retardancy qualities of upholstered furniture and seating devices.

Applicant has found that the drawbacks associated with prior art pressure-compensating compositions can be overcome through the use of compositions having microballoons homogeneously dispersed in a mixture of silicone fluid (and especially silicone fluid having a viscosity between about 50 and about 10,000 centipoise), and a fatty amide thickener which is essentially insoluble in the silicone fluid.

SUMMARY OF THE INVENTION

The present invention contemplates a pressure-compensating pad comprising a flexible envelope containing a flowable, pressure-compensating composition. The pressure-compensating composition comprises a mixture of major weight portion of silicone fluid, and minor weight portion of an amide thickener which is essentially insoluble in said silicone, and microballoons uniformly dispersed in said mixture.

The silicone fluid should generally have a viscosity of between about 50 and 10,000 centipoise. The silicone fluid may comprise between about 32 and about 95 weight percent of the composition.

The amide thickener is a fatty amide selected from the amides of fatty acids having between 12 and 32 carbon atoms in the acid chain. The amide thickener may comprise from about 3 to 20% by weight of the overall composition and from about 4 to 16% of the weight of the silicone fluid. The fatty amides are essentially insoluble in the silicone fluid, and as a result, the silicone fluid and the fatty amide do not form a homogeneous, continuous phase. However, it is important to thoroughly disperse the fatty amide throughout the silicone fluid as uniformly as possible. To that end, it is desirable to have the fatty amide dispersed throughout the silicone fluid in extremely finely divided form. The mixture of the silicone fluid and the amide thickener form a flowable component in which the microballoons are uniformly dispersed.

The microballoons may be formed from glass or other ceramic materials or phenolic or other plastic materials. The glass microballoons are generally preferred, but mixtures of microballoons made from two or more different materials, or having different sizes, may be used. Microballoons may comprise from about 0.5 to about 65 weight percent and generally make up approximately 50–60 volume percent of the composition. The weight percent of the microballoons will depend upon whether the microballoons are composed of glass, phenolic, or plastic.

The flowable pressure-compensating compositions of the present invention disclosure are especially useful as filling materials for deformable, pressure-compensating padding devices. These compositions are particularly characterized by their: (1) ability to deform by flowing in response to continuously applied pressure, (2) ability to maintain their shape and position in the absence of a continuously applied presence, (3) lack of resiliency, (4) small changes in viscosity when subjected to changes in temperature, (5) resistance to phase separation of their thickener and/or microballoon components, (6) exceptional fire retardancy qualities, (7) chemical compatibility with polyurethane films, (8) excellent skin contact characteristics (i.e., very low probability of skin irritation), (9) essentially non-poisonous, (10) low microorganism food value, and (11) viscosity stability over time.

In their most simple forms, the materials useful in formulating the flowable component of applicant's compositions may be a single silicone fluid and a single thickener. Alternatively, the silicone fluid may comprise a mixture of several silicone fluids and, as such, may contain silicone fluids having viscosities greater than about 10,000 centipoise. In such cases, however, the overall silicone fluid mixture, preferably, still will have a resulting viscosity in the 50–10,000 centipoise viscosity range. For the purposes of this patent disclosure, centipoise units may be regarded as being comparable to centistoke units.

The compositions of the present invention are particularly useful as filling materials for deformable, pressure-compensating pads comprising: (1) a flexible protective envelope having a cavity which contains the composition and which envelope has structure which allows said composition to flow in said cavity in response a continuously applied load upon said envelope; and wherein the composition comprises (2) a flowable, pressure-compensating composition comprised of a major weight portion of silicone fluid, a minor weight portion of an amide thickener and a minor weight portion by weight of at least one microballoon species. Optional ingredients such as fire retardancy agents may also be employed to advantage in some compositions.

DESCRIPTION OF PREFERRED EMBODIMENTS

Ranges of Relative Proportions of Ingredients

The flowable component of applicant's overall composition, either with or without flame-retardant agents, will comprise the silicone fluid. The silicone fluid may comprise from about 32 to about 95 weight percentage of the overall composition. The amide thickener may comprise from about 3 to about 20 weight percent of the composition. The microballoons may comprise from about 0.5 to about 65 weight percent of such compositions. Flame-retardants, if used, will generally comprise from about 2 to about 7 percent of the overall composition.

The usable ranges, the preferred ranges and the best proportions, in percent by weight, are described in Tables I (General Formulations), II (Formulations with Glass Microballoons) and III (Formulations with Glass Microballoons with Two Silicones Fluids). The formulations which employ two silicone fluids provide compositions which have a greater resistance to flow in response to momentary pressure caused by rapid movement of a user. In other words, the compositions which include two silicone fluids are more supportive and have a different "feel" than similar compositions which include only one silicone fluid.

TABLE I

| GENERAL FORMULATIONS | | |
|---|---|---|
| Ingredient | Usable Range | Preferred Range |
| Silicone fluid | 32 to 95 | 55 to 90 |
| Amide Thickener | 3 to 20 | 3 to 12 |
| Microballoons | 0.5 to 65 | 0.5 to 40 |

TABLE II

| FORMULATIONS WITH GLASS MICROBALLOON | | | |
|---|---|---|---|
| Ingredient | Usable Range | Preferred Range | Best Proportion |
| Silicone Fluid | 35 to 92 | 55 to 69 | 62.04 |
| Amide Thickener | 3 to 20 | 3 to 10 | 3.96 |
| Glass Microballoons | 5 to 65 | 28 to 40 | 34.00 |

When other ingredients such as high viscosity silicone fluids and fire-retardants are used in Applicant's compositions, the relative proportions of the ingredients will change somewhat, but not to a great extent. For example, formulations with a high viscosity silicone fluid and a fire-retardant may comprise the following proportions:

TABLE III

| FORMULATIONS WITH GLASS MICROBALLOONS WITH TWO SILICONE FLUIDS | | |
|---|---|---|
| Ingredient | Preferred Range | Best Proportion |
| Low Viscosity Silicone fluid | 49.5 to 65 | 55.44 |
| High Viscosity Silicone fluid | 0 to 15 | 3.30 |
| Amide Thickener | 3.3 to 10 | 3.96 |
| Glass Microballoons | 28 to 40 | 34.00 |
| Fire-Retardant | 3.0 to 6.5 | 3.30 |

The Silicone Fluid

The silicone fluid of the herein described flowable pressure-compensating compositions may be formulated or obtained from any number of commercial sources. Dimethyl silicones, phenyl silicones and alkyl pendent silicones are especially well suited to the practice of this invention. Some of the more common commercial sources of such silicone fluids are Dow Corning Corporation and General Electric Corporation. For example, Dow Corning produces a family of silicone fluids under the trademark 200 ® series having viscosities between 0.65 and 100,000 centistokes. The commercial literature for these silicone fluids generally give the viscosity in centistokes (CS) units which, for the purposes of this patent disclosure, can be regarded as comparable to the centipoise units generally employed in this patent disclosure.

Various silicone fluids produced by General Electric also are well suited for use in applicant's compositions. These include the silicone fluids sold under the *General Electric* trademark SF96 ® which have average molecular weights between 800 and 28,000 with corresponding viscosities between 5 to 1,000 centistokes. General Electric also sells silicone fluids under the General Electric trademark VISCASIL ® which have overall molecular weights between 49,300 and 260,000 with corresponding viscosities between 5,000 and 600,000 centistokes.

The Amide Thickener

The amide thickeners are generally fatty amide compounds. The fatty amides are derived from fatty acids containing between 12 and 32 carbon atoms which are saturated or mono-unsaturated. The preferred thickeners include dimer amides of such acids and particularly the ethylene diamides of such acids. The useful fatty amides include erucamide, lauramide, oleamide, stearamide, behenamide, tallow amides, glycoamides, palmitamide, and other long chain fatty amides. Suitable FATTY amide thickeners are available under the following tradenames: Kemamide, Adogens (A.D.M. Co.), Armour (Armak Co.), Ross (Ross Co.), Hoechst Wachs-C (Hoechst Celanese), and Paracins & Flexricines (Caschem).

The fatty amides useful in the practice of this invention generally: (1) have relatively high melting points (e.g., 185°-350° F.); (2) be tough and/or hard; and (3) retain their quality of hardness up to their melting point. The compositions of the present invention may employ two or more fatty amides as the thickener. Some particularly preferred fatty amides are:

| Name | Melting Point |
|---|---|
| Kemamide ® W-20 N,N'-ethylene bis-oleamide (Oleamidoethyl oleamide) | 248° F. |
| Kemamide ® W-40 N,N'-ethylene bis-stearamide (Stearamideoethyl stearamide) | 284° F. |
| Paracin ® 220 N-(2-hydroxyethyl)-12-hydroxy stearamide | 218° F. |
| Paracin ® 285 N,N'-ethylene bis(12-hydroxy stearamide) | 285° F. |

The fatty amide thickeners which are used in the compositions of the present invention do not dissolve to any appreciable degree in the silicone fluids. Consequently, the amide thickener does not form a solution with silicone fluid and the mixture of those two components is not a continuous phase as described in the prior art. Thus, it is advantageous to cause the amide thickener to be present in the silicone fluid in an extremely finely divided form. It is essential that the amide thickener be uniformly dispersed throughout the silicone fluid to make up the flowable component of the composition of the present invention.

The Microballoons

The microballoons used in all of applicant's formulations will be discrete micro-sized particles. The microballoons constitute a discontinuous, solid phase uniformly dispersed in the silicone fluid/amide thickener mixture which comprises the flowable component. Microballoons having a more or less spherical shape are particularly preferred, but forms other than spherical may be employed, e.g., oblong cellular forms. Mixtures of different microballoon species also may be used in the practice of this invention. The size of the microbeads will preferably be within the size range of about 10 to about 300 microns. Between about 0.5 and up to about 65 weight percent of such microballoons may be used, but it is generally preferred to use from about 30 to about 40 weight percent of glass microballoons.

The density of such microballoons generally will be between about 0.025 and about 0.80 gm/cc. Microballoons serve as density-reducing components of these pressure-compensating compositions. Therefore, the weight of the microballoons in most cases will be lower than the combined weight of all of the other components, including the silicone fluid ingredients. Although glass microballoons are preferred, phenolic, carbon, ceramic or polymeric microballoons may be used in the compositions of the present invention. The volume of microballoons in the flowable pressure-compensating compositions affects the overall viscosity of these compositions. The maximum theoretical loading for spherical microballoons of the same size, with nearly perfect packing of the microballoons, is about 74% by volume. However, the maximum loading of the microballoons in the herein described compositions is less than this theoretical maximum, and preferably a microballoon loading is from about 50 to about 60 volume percent.

Glass microballoons, which are preferred, generally have densities in the 0.15–0.8 g/cc range. Phenolic microballoons have densities in the 0.15–0.25 g/cc range. Plastic (i.e. copolymer or acrylic) microballoons have densities in the 0.025–0.15 g/cc range. Obviously, such differences can have rather significant effects on the overall densities of applicant's compositions which may range from about 0.30 to 0.95 g/cc. For example, a 1 cubic centimeter quantity of a representative composition might have 0.42 cc of liquid and 0.58 cc of microballoons. Assuming a liquid density of about 1.0 g/cc (0.9885 actual), the liquid weight of the composition would be about 0.42 grams. In any event, with such differences in the densities of the microballoons, the microballoon weight proportion of the overall composition can vary considerably. Compositions having the preferred range of from about 0.5% to about 40% by weight of microballoons will have specific gravity in the range from about 0.36 to about 0.90 g/cc.

Glass microbeads sold by Minnesota Mining and Manufacturing Co. (3M) under the trade designation Scotchite® K-37, have been found to be especially well suited for use in the fluid compositions of the present invention. These particular microbeads have a nominal density of 0.37 gm/cc and a range of density between about 0.34 and 0.40 gm/cc. These particular beads have an isostatic compressive strength of approximately 2,000 psi. In addition to their K-37® microbeads, 3M's S-32® and K-25® microbeads (and mixtures thereof) also may be used to great advantage in the practice of this invention. Another preferred commercial source of such microbeads is Emerson & Cuming, Inc. of Canton, Mass. Their microbeads are sold under their trademark designation IG-25® glass microbeads.

Fire Retardancy Agents

Fire retardant agents are not required in the compositions of the present invention. However, in those instances where improved fire retardancy is desired, fire retardants may be added to the compositions of the present invention in varying amounts. Among the useful fire retardants, the halogenated plastic resin materials such as CPVC, PVC, PVDC and the like are the most preferred fire retardants. For the most part, halogenated, plastic resins are better employed in their so-called "unmodified" forms. That is the halogenated plastic resin ingredients most preferably are not employed with any of the extender, plasticizer, stabilizer, etc. ingredients with which they are often employed in other technologies. The fire retardant agents are particularly effective when they are introduced into the silicone fluid in the form of solid particulate materials rather than dissolved in some solvent fluid.

Other Optional Ingredients

A variety of other materials may be added to the compositions of the present invention for various purposes. For example, one may use extenders, stabilizers, surfactants, fungicides and the like with the compositions described herein.

The Mixing Process

The flowable pressure-compensating compositions of the present invention may be produced using a variety of mixing processes. For example, a portion of the silicone fluid may first be thoroughly mixed with the amide thickener. The use of heat, sufficient to melt the amide thickener, in this step of mixing process facilitates an uniform dispersion of the amide thickener throughout the silicone fluid. Next, the balance of the silicone fluid, along with any auxiliary materials (such as fire retardants), is added to the silicone fluid/amide mixture. These components are mixed thoroughly to create the flowable component of the composition. Finally, the microballoons are added to the silicone fluid/amide mixture and mixed therein to uniformly disperse the microbeads throughout the flowable component.

The Envelope

The envelope in which applicant's flowable, pressure-compensating fitting material are to be confined may be fabricated from any flexible sheet-like material which is inert with respect to the flowable pressure-compensating composition and/or any liquid component thereof. The materials from which the envelopes are made should also provide a complete barrier for all components of the composition. The envelopes may be formed of a variety of flexible and pliable materials known to the art, e.g., synthetic resinous materials, such as polyurethanes. Polyurethane films are useful in the practice of this invention because they possess superior softness, suppleness, and strength compared to, for example, PVC films. Polyurethanes do not contain plasticizers which may leach out over time to cause the film to harden, crack, or otherwise change in an undesirable manner. Preferably the material used to construct the envelope will be heat or radio frequency sealable to provide a substantially impervious seal which prevent leakage of any and all materials. The resinous film material also should be very flexible and/or elastomeric, both at ambient room temperatures and at the temperatures at which such pressure-compensating pads are used e.g., in the vicinity of 100° F. It also is important that the envelope material be durable and retain its flexible, pliable properties over extended periods of use.

THE EXAMPLES

The following examples will serve to illustrate the preparation of several flowable pressure-compensating compositions within the scope of the present invention. It is understood these examples are set forth merely for illustrative purposes and many other compositions are within the scope of the present invention. Those skilled in the art will recognize that the compositions containing other quantities of material and different species of the required materials may be similarly prepared.

The compositions described in the following examples were prepared, as far as possible, according to the following general procedure. About 25% by weight of the 500 centipoise silicone fluid is placed in a mixing vessel. The fatty amide is added thereto. The mixture is heated with stirring to about 300° to melt the fatty amide. Another 25% of the 500 centipoise silicone fluid while cold is added to the mixing vessel with stirring. The mixture is cooled to room temperature and run through a colloid mill at high rpm, at a low material feed rate. The material emerges from the mill as a uniform mixture at an elevated temperature, but is thereafter allowed to cool.

This uniform mixture is thereafter mixed with any high viscosity silicone fluid, any fire retardant and the remaining 500 centipoise silicone fluid in a low shear mixer to produce final a uniform mixture of the flowable component. Thereafter, the flowable component is placed in low shear mixer and the required quantity of microballoons is added thereto with stirring, to uniformly disperse the microbeads in the mixture. The resulting flowable pressure-compensating compositions were then placed, with no heating, in suitable envelopes.

| Ingredient Identification | % by Weight |
|---|---|
| EXAMPLE 1 | |
| Silicone Fluid 500 centipoise viscosity | 65.76% |
| Silicone Fluid, 60,000 centipoise viscosity | 14.51% |
| Witco ® W-20 fatty amide | 10.44% |
| Witco ® W-40 fatty amide | 1.16% |
| CPVC | 4.84% |
| Plastic microballoons | 3.30% |
| EXAMPLE 2 | |
| Silicone Fluid 500 centipoise viscosity | 65.76% |
| Silicone Fluid, 60,000 centipoise viscosity | 14.51% |
| Paracin ® 220 fatty amide | 10.44% |
| Witco ® W-40 fatty amide | 1.16% |
| CPVC | 4.84% |
| Plastic microballoons | 3.30% |
| EXAMPLE 3 | |
| Dow Corning Silicone Fluid 200 ® 500 centipoise | 55.44% |
| Dow Corning Silicone Fluid 200 ® 60,000 centipoise | 3.30% |
| Paracin ® 285 fatty amide | 3.96% |
| CPVC resin | 3.30% |
| K37 ® Glass Microballoons | 34.00% |
| EXAMPLE 4 | |
| Dow Corning Silicone Fluid 500 centipoise viscosity | 58.74% |
| Dow Corning Silicone Fluid 60,000 centipoise viscosity | 3.30% |
| Paracin ® 285 fatty amide | 3.96% |
| K37 ® Glass Microballoons | 34.00% |
| EXAMPLE 5 | |
| Dow Corning Silicone Fluid 500 centipoise viscosity | 64.60% |
| Paracin ® 285 fatty amide | 3.40% |
| K37 ® Glass Microballoons | 32.00% |
| EXAMPLE 6 | |
| Silicone Fluid 500 centipoise viscosity | 55.44% |
| Silicone Fluid 60,000 centipoise viscosity | 3.30% |
| Kemamide W40 fatty amide | 3.96% |
| CPVC | 3.30% |
| K37 Glass Microballoons | 34.0% |
| EXAMPLE 7 | |
| Silicone Fluid 500 centipoise viscosity | 51.5% |

-continued

| Ingredient Identification | % by Weight |
|---|---|
| Silicone Fluid 60,000 centipoise viscosity | 3.3% |
| Paracin ® 220 fatty amide | 7.9% |
| K37 Glass Microballoons | 34.0% |
| CPVC | 3.3% |
| EXAMPLE 8 | |
| Silicone Fluid 500 centipoise viscosity | 51.5% |
| Silicone Fluid 60,000 centipoise viscosity | 3.3% |
| Kemamide W20 fatty amide | 7.9% |
| CPVC | 3.3% |
| K37 Glass Microballoons | 34.0% |

The compositions of the present invention, as illustrated by the examples, and particularly the formulations of Examples 3–5, perform differently than the prior art products which are based upon petroleum-based oils and petroleum-based waxes. The compositions of the present invention are superior to the prior art products for the following reasons:

a) The composition of the present invention does not significantly separate when exposed to body temperatures of about 95° F. to 100° F. for extended periods. (i.e. 6 months or more) .
b) The composition of the present invention does not pose a significant skin sensitization or irritation potential.
c) The composition of the present invention has a much lower flammability when tested by the Cal 133 requirements or other relevant fire tests.
d) The composition of the present invention has a much higher viscosity index i.e. the viscosity in stable over a range of temperatures, as compared to prior art compositions.
e) The composition of the present invention does not stiffen to unacceptably high viscosities when chilled to low temperatures (40° F. approximate).
f) When placed into a bladder and cycled repeatedly through a simulated use test (mechanical "butt" test), the composition of the present invention will not form any evidence of hard lumps.
g) When placed into a bladder and weighted with a static weight for long periods of time (simulating long use by an inactive user), the composition of the present invention will not form any evidence of hard lumps.
h) The composition of the present invention has a low micro-organism food value potential and thereby has a low tendency to support the growth of micro-organisms such as mold and bacteria.
i) The composition of the present invention has a high LD50 threshold (low risk of poisoning upon ingestion).
j) No ingredients of the composition leach from or evaporate through the urethane film which is used for the envelope.
k) No ingredients of the composition are chemically reactive with the urethane film used for the envelope.

The superiority of the compositions of the present invention is illustrated by the following tests.

PHASE SEPARATION TESTING

Applicant compared a composition of the present invention (Example 3) with several of compositions of the prior art literature.

The prior art formulations were made up by the following examples of the following US patents:

SOURCE OF PRIOR ART

| Code | Prior Art Patent | Example | Component | Weight Percentage |
|---|---|---|---|---|
| 762-3 | 4,038,762 | 3 | HM 1319 Wax | 57.7% |
| | | | Tufflo 6204 oil | 38.5% |
| | | | plastic microballoons | 3.8% |
| | | | | 100% |
| 762-5 | 4,038,762 | 5 | micro crystalline wax | 62.3% |
| | | | Carnea 21 oil | 7.3% |
| | | | glycanol plasticizer | 3.7% |
| | | | Topco SAE 20 oil | 18.3% |
| | | | plastic microballoons | 8.4% |
| | | | | 100% |
| 658-1 | 4,144,658 | 1 | HM 1319 Wax | 17.5% |
| | | | Tufflo 6204 oil | 52.5% |
| | | | glass microballoons | 30.0% |
| | | | | 100% |
| 546-1 | 4,229,546 | 1 | HM 1319 Wax | 20.2% |
| | | | Tufflo 6204 oil | 60.7% |
| | | | glass microballoons | *17.4% |
| | | | plastic microballoons | *1.7% |
| | | | | 100% |
| 202-2 | 4,255,202 | 2 | HM 1454 wax | 70% |
| | | | glass microballoons | 30% |
| | | | | 100% |

*these weights provided a 50/50 mixture, based on volume

The primary object of this test was to compare the relative abilities of the respective compositions to withstand phase separation under progressively higher temperature conditions. To this end, each composition was tested at 100°, 130° and 175° F. for a test period of 14 days. In each instance, a 500 ml sample of the composition being tested was placed in ½" thick 8" wide×12" clear polyurethane film bags. These bags were then hung vertically in ovens at 100°F., 130° F. and 175° F. At the 14 day conclusion of these tests, any separated fluid was recovered using a syringe and measured. The results are shown in Table 4 below.

TABLE 4

COMPARISON OF PHASE SEPARATION TEST RESULTS PERCENTAGE BY WEIGHT OF FLUID SEPARATED AFTER 14 DAYS AT TEMPERATURES OF

| FORMULATION | 100° F. | 130° F. | 175° F. |
|---|---|---|---|
| Prior Art 762-3 | 0 | 8.6 | 21.5 |
| Prior Art 762-5 | 0 | 0 | 28.0 |
| Prior Art 658-1 | 0 | 1.4 | 20.5 |
| Prior Art 546-1 | 0.6 | 24.5 | 26.9 |
| Prior Art 202-2 | 0 | 1.1 | 7.2 |
| EXAMPLE 3 | 0 | 0 | 0 |

FURTHER TEMPERATURE SENSITIVITY TESTS

Temperature Sensitivity Test Procedure

Applicant compared the viscosity at 75° F., 95° F., 110°F., and 130° F. of various prior art formulations to various compositions prepared according to the teachings of this patent disclosure. Viscosity was measured with Brookfield Viscometer, Model DV-II, spindle No. 7, 10 rpm.

Calculation of Temperature Sensitivity Index $$\text{Temperature Sensitivity Index} = \frac{\text{Viscosity at 130° F.} \times 100\%}{\text{Viscosity at 75° F.}}$$

The closer to 100%, the less temperature sensitive the material is. The results of the test are shown in Table 5.

TABLE 5

| Composition | Index |
|---|---|
| Prior Art Formulation 762-3 | 13.5% |
| Prior Art Formulation 762-5 | *Unable to Calculate but very low (approx. 15%) |
| Prior Art Formulation 658-1 | 29.0% |
| Prior Art Formulation 546-1 | 12.5% |
| Prior Art Formulation 202-2 | 35.4% |
| Example 3 Formulation | 70.7% |

*All measurements on Formulation 762-5 were off scale (high) below 130° F. The Index is very low, meaning the composition is very temperature sensitive.

The viscosity of Applicant's compositions exhibited extremely low sensitivity to changing temperatures relative to prior art compositions, as shown by the data in Table 5. By way of further example, the viscosities of applicant's fluid compositions generally decrease by only abut 2.5% in going from 75° F. to 95° F. The prior art compositions exhibited much higher viscosity change over the same temperature range (e.g., they often exhibited a 50% decrease in viscosity in going from 75° F. to 95°F.).

Fire Retardancy Tests

Applicant's compositions were tested for their fire-retardant qualities relative to various prior art compositions by a test procedure very comparable to a well known test often referred to as the "Cal 133" test (California Technical Bulletin 133). Basically, such tests were carried out by first placing a test specimen on a 12"×12" metal sheet containing a 1" layer of the fluid to be fire tested. The metal sheet had a ½" lip around the perimeter to contain any melted fluid. In applicant's test a CAL 133 cubical wire cage, approximately 10"×10"×10" was fabricated and 5 sheets of double wide standard newsprint were crumpled up and loosely packed into this cage. The fluid was then worked into a layer approximately 12"×12"×1" onto the sheet. The sheet alone and the sheet with the fluid was weighed prior to testing. The cage with paper was placed in the center of the fluid mass and ignited on the cube vertical faces, at which point the test timer was started.

The test measured the time to self-extinguish and the percent of fluid weight loss for a wide variety of compositions. For example, the results for various prior art fluid compositions relative to one of applicant's preferred compositions (the composition described in Example 3 of this patent disclosure) are given in Table 6. The composition of Example 3 was the only composition to self-extinguish before a substantial quantity of the composition was consumed by fire.

TABLE 6

| | Formula Code | Weight Loss Percent | Total Burn Time (Minutes |
|---|---|---|---|
| Prior Art Formulation | 762-3 | 74.2 | 23.9 |
| Prior Art Formulation | 762-5 | 75.3 | 9.8* |
| Prior Art Formulation | 658-1 | 46.3 | 38.1 |
| Prior Art Formulation | 546-1 | 71.7 | 58.5 |
| Prior Art Formulation | 202-2 | 47.9 | 57.7 |
| Example 3 Formulation | | 1.7 | 7.8** |

*Intense fire, Large quantities of black smoke, material consumed very rapidly by fire.
**Self extinguished (as shown by low weight loss).

The fire retardancy compositions of the present invention containing glass microballoons were compared to similar compositions containing an identical volume of plastic microballoons using a vertical flame test (i.e. similar to the "CAL 117" test). Although the compositions containing glass beads show superior fire retardancy to a superimposed burning material (i.e. the CAL 133 test), the compositions containing the plastic microballoons showed superior flame retardancy over the comparable glass bead-containing compositions as measured by the vertical flame test. This is surprising because the plastic microballoons are filled with a very flammable blowing agent: isobutane gas. It is postulated that the tightly packed glass microballoons act as a wick for the fluid just below a flame surface that has been heated to a lower, more flowable viscosity.

Those skilled in this art will appreciate that the pressure-compensating pads and the compositions contained in them which are described in this patent disclosure should be considered as being illustrative. Numerous modifications may be made within the teachings of this patent disclosure without departure from the spirit and scope of the appended claims.

What is claimed is:

1. A pressure-compensating pad comprising:
 a flexible envelope containing a flowable, pressure-compensating composition, said envelope having a structure that allows said composition to flow within said envelope in response to pressure continuously applied to said pad; and
 said composition comprising a mixture of a major weight portion of silicone fluid, and a minor weight portion of amide thickener which is essentially insoluble in said silicone fluid and microballoons uniformly dispersed in said mixture, wherein said composition flows in response to continuously applied pressure, but resists flow and tends to maintain its shape and position in the absence of continuously applied pressure.

2. The pressure-compensating pad of claim 1 wherein said silicone fluid has a viscosity between about 50 and 10,000 centipoise.

3. The pressure-compensating pad of claim 1 wherein said silicone fluid in the combination comprises between about 55 and about 90 weight percent of said composition.

4. The pressure-compensating pad of claim 1 wherein said silicone fluid is a combination of at least two silicone fluids having different viscosities.

5. The pressure-compensating pad of claim 1 wherein said silicone fluid is comprised of a first silicone fluid having a viscosity between about 50 and 10,000 centipoise and a second silicone fluid having a viscosity greater than 10,000 centipoise, but less than 100,000 centipoise.

6. The pressure-compensating pad of claim 1 wherein the amide thickener comprises between about 3 percent and about 12 weight percent of said composition.

7. The pressure-compensating pad of claim 1 wherein said amide thickener comprises mono amides or diamides derived from fatty acids having from about 12 to 32 carbon atoms in the fatty acid chain.

8. The pressure compensating pad of claim 7 wherein said amide thickener comprises mono amides or diamides derived from a fatty acid selected from the group consisting of stearic acid, oleic acid and mixtures thereof.

9. The pressure-compensating pad of claim 1 wherein said microballoons comprise between about 50 and about 60 volume percent of said composition.

10. The pressure-compensating pad of claim 1 wherein said microballoons are glass microballoons.

11. The pressure-compensating pad of claim 10 wherein said glass microballoons comprise between about 28 and 40 weight percent of said composition.

12. The pressure-compensating pad of claim 1 wherein said microballoons are selected from the group consisting of glass microballoons, phenolic microballoons, plastic microballoons, and mixtures thereof.

13. The pressure-compensating pad of claim 1 wherein said composition further comprises a fire retardant.

14. The pressure-compensating pad of claim 13 wherein said fire retardant comprises a powdered, halogenated, plastic resin fire retardant which does not dissolve in the silicone fluid.

15. The pressure-compensating pad of claim 13 wherein said fire retardant comprises from about 3.0 to 6.5% by weight of said composition.

16. The pressure-compensating pad of claim 13 wherein said fire retardant comprises CPVC.

17. The pressure-compensating pad of claim 13 wherein said fire retardant comprises PVC.

18. The pressure-compensating pad of claim 13 wherein said fire retardant comprises PVDC.

19. The pressure-compensating pad of claim 1 wherein the amide thickener comprises between about 3% and about 20% by weight of said composition.

20. The pressure-compensating pad of claim 1 wherein said microballoons are phenolic microballoons.

21. The pressure-compensating pad of claim 20 wherein said phenolic microballoons comprise between about 0.5 to about 40% by weight of said composition.

22. The pressure-compensating pad of claim 1 wherein said microballoons are plastic microballoons.

23. The pressure-compensating pad of claim 22 wherein said plastic microballoons comprise between about 0.5 to about 40% by weight of said composition.

24. A pressure-compensating pad comprising:
 a flexible envelope containing a flowable, pressure-compensating composition, said envelope having a structure that allows said composition to flow within said envelope;
 said composition comprising a mixture of from about 55 to about 90 weight percent of silicone fluid, and from about 3 to about 12 weight percent of amide thickener which is essentially insoluble in said silicone fluid and from about 0.5 to about 40 weight percent of microballoons, uniformly dispersed in said mixture;
 wherein said composition flows in response to continuously applied pressure, but resists flow and tends to maintain its shape and position in the absence of continuously applied pressure.

25. A pressure-compensating pad of claim 24 wherein said microballoons are phenolic microballoons.

26. The pressure-compensating pad of claim 24 wherein said microballoons are plastic microballoons.

27. The pressure-compensating pad of claim 24 wherein said microballoons are selected from the group consisting of plastic microballoons, phenolic microballoons, glass microballoons, and mixtures thereof.

28. The pressure-compensating pad of claim 27 wherein said amide thickener comprises monoamides or diamides derived from a fatty acid selected from the group consisting of stearic acid, oleic acid, and mixtures thereof.

29. The pressure-compensating pad of claim 24 wherein said amide thickener comprises monoamides or diamides derived from fatty acids having from about 12 to 32 carbon atoms in the fatty acid chain.

30. The pressure-compensating pad of claim 24 wherein said composition further comprises a fire retardant.

31. The pressure-compensating pad of claim 30 wherein said fire retardant comprises from about 3.0 to 6.5% by weight of said composition.

32. The pressure-compensating pad of claim 30 wherein said fire retardant comprises a powdered, halogenated, plastic resin fire retardant which does not dissolve in the silicone fluid.

33. A pressure-compensating pad comprising:

a flexible envelope containing a flowable, pressure-compensating composition, said envelope having a structure that allows said composition to flow within said envelope;

said composition comprising a mixture of from about 55 to about 69 weight percent of silicone fluid, and from about 3 to about 10 weight percent of amide thickener which is essentially insoluble in said silicone fluid and from about 28 to about 40 weight percent of glass microballoons dispersed in said mixture;

wherein said composition flows in response to continuously applied pressure, but resists flow and tends to maintain its shape and position in the absence of continuously applied pressure.

34. The pressure-compensating pad of claim 33 wherein said amide thickener comprises monoamides or diamides derived from fatty acids having from about 12 to 32 carbon atoms in the fatty acid chain.

35. The pressure-compensating pad of claim 34 wherein said amide thickener comprises monoamides or diamides derived from a fatty acid selected from the group consisting of stearic acid, oleic acid, and mixtures thereof.

36. The pressure-compensating pad of claim 33 wherein said composition further comprises a fire retardant.

37. The pressure-compensating pad of claim 36 wherein said fire retardant comprises from about 3.0 to 6.5% by weight of said composition.

38. The pressure-compensating pad of claim 36 wherein said fire retardant comprises a powdered, halogenated, plastic resin fire retardant which does not dissolve in the silicone fluid.

39. A pressure-compensating pad comprising:

a flexible envelope containing a flowable, pressure-compensating composition, said envelope having a structure that allows said composition to flow within said envelope;

said composition comprising a mixture of from about 32 to about 95 weight percent of silicone fluid, and from about 3 to about 20 weight percent of amide thickener which is essentially insoluble in said silicone fluid and from about 0.5 to about 65 weight percent of microballoons, uniformly dispersed in said mixture;

wherein said composition flows in response to continuously applied pressure, but resists flow and tends to maintain its shape and position in the absence of continuously applied pressure.

40. A pressure-compensating pad of claim 39 wherein said microballoons are phenolic microballoons.

41. The pressure-compensating pad of claim 39 wherein said microballoons are plastic microballoons.

42. The pressure-compensating pad of claim 39 wherein said microballoons are selected from the group consisting of plastic microballoons, phenolic microballoons, glass microballoons, and mixtures thereof.

43. The pressure-compensating pad of claim 39 wherein said amide thickener comprises monoamides or diamides derived from fatty acids having from about 12 to 32 carbon atoms in the fatty acid chain.

44. The pressure-compensating pad of claim 43 wherein said amide thickener comprises monoamides or diamides derived from a fatty acid selected from the group consisting of stearic acid, oleic acid, and mixtures thereof.

45. The pressure-compensating pad of claim 39 wherein said composition further comprises a fire retardant.

46. The pressure-compensating pad of claim 39 wherein said fire retardant comprises from about 3.0 to 6.5% by weight of said composition.

47. The pressure-compensating pad of claim 39 wherein said fire retardant comprises a powdered, halogenated, plastic resin fire retardant which does not dissolve in the silicone fluid.

48. A pressure-compensating pad comprising:

a flexible envelope containing a flowable, pressure-compensating composition, said envelope having a structure that allows said composition to flow within said envelope;

said composition comprising a mixture of from about 35 to about 92 weight percent of silicone fluid, and from about 3 to about 20 weight percent of amide thickener which is essentially insoluble in said silicone fluid and from about 5 to about 65 weight percent of glass microballoons dispersed in said mixture;

wherein said composition flows in response to continuously applied pressure, but resists flow and tends to maintain its shape and position in the absence of continuously applied pressure.

49. The pressure-compensating pad of claim 48 wherein said amide thickener comprises monoamides or diamides derived from fatty acids having from about 12 to 32 carbon atoms in the fatty acid chain.

50. The pressure-compensating pad of claim 49 wherein said amide thickener comprises monoamides or diamides derived from a fatty acid selected from the group consisting of stearic acid, oleic acid, and mixtures thereof.

51. The pressure-compensating pad of claim 48 wherein said composition further comprises a fire retardant.

52. The pressure-compensating pad of claim 51 wherein said fire retardant comprises from about 3.0 to 6.5% by weight of said composition.

53. The pressure-compensating pad of claim 51 wherein said fire retardant comprises a powdered, halogenated, plastic resin fire retardant which does not dissolve in the silicone fluid.

* * * * *